(12) United States Patent
Zeira et al.

(10) Patent No.: US 8,705,456 B2
(45) Date of Patent: Apr. 22, 2014

(54) FAST UPLINK RESPONSE TO DOWNLINK SHARED CHANNEL TRANSMISSION WITHOUT A DEDICATED UPLINK CHANNEL

(75) Inventors: Eldad M. Zeira, Huntington, NY (US); Alexander Reznik, Titusville, NJ (US); Sudheer A. Grandhi, Mamaroneck, NY (US); Christopher R. Cave, Verdun (CA); Paul Marinier, Brossard (CA); Rocco DiGirolamo, Laval (CA)

(73) Assignee: InterDigital Technology Corporation, Wilmington, DE (US)

( * ) Notice: Subject to any disclaimer, the term of this patent is extended or adjusted under 35 U.S.C. 154(b) by 201 days.

(21) Appl. No.: 11/970,101

(22) Filed: Jan. 7, 2008

(65) Prior Publication Data
US 2008/0165697 A1 Jul. 10, 2008

Related U.S. Application Data

(60) Provisional application No. 60/883,735, filed on Jan. 5, 2007.

(51) Int. Cl.
*H04L 1/00* (2006.01)
*H04L 5/00* (2006.01)

(52) U.S. Cl.
CPC ................................ *H04L 5/0057* (2013.01)
USPC ............................................ 370/329; 455/522

(58) Field of Classification Search
CPC ... H01L 1/0026; H01L 1/1671; H01L 1/0027; H01L 1/0028; H01L 1/1822; H01L 5/0055; H01L 5/0057; H04W 72/0406
USPC .................................. 370/326, 345; 455/69
See application file for complete search history.

(56) References Cited

U.S. PATENT DOCUMENTS 5,621,723 A * 4/1997 Walton et al. ................. 370/335
6,424,056 B1 * 7/2002 Irvin ............................ 307/10.1

(Continued)

FOREIGN PATENT DOCUMENTS

| EP | 1 892 990 | 2/2008 |
| WO | 2006/135064 | 12/2006 |
| WO | 2007/000696 | 1/2007 |

OTHER PUBLICATIONS

Third Generation Partnership Project, "Technical Specification Group Radio Access Network; Physical channels and mapping of transport channels onto physical channels (TDD) (Release 5)," 3GPP TS 25.221 V5.6.0 (Jun. 2005).

(Continued)

*Primary Examiner* — Kibrom T Hailu
*Assistant Examiner* — Benjamin Lamont
(74) *Attorney, Agent, or Firm* — Eric Berkowitz (57) ABSTRACT

A method and apparatus for uplink transmission over a non-contentious shared feedback channel are disclosed, wherein the parameters of the uplink transmission are determined by the parameters of a downlink transmission. A new uplink channel, called a physical shared uplink feedback channel (PSUFCH) is used for uplink transmission such as feedback information in response to a downlink transmission on a fast shared data channel. The content of the feedback information may be general, e.g. an ACK/NACK or a channel quality indicator (CQI). The PSUFCH is transmitted using power ramping that terminates upon reception of a downlink ACK (DLACK) from a Node-B. No ambiguity resolution is required due to the non-contentious and deterministic mapping of the uplink channel resources.

18 Claims, 6 Drawing Sheets

(56) References Cited

U.S. PATENT DOCUMENTS

| | | | |
|---|---|---|---|
| 7,124,350 B2* | 10/2006 | Chao et al. | 714/776 |
| 7,480,269 B2* | 1/2009 | Heo et al. | 370/328 |
| 7,586,948 B2* | 9/2009 | Hiddink et al. | 370/473 |
| 2003/0050084 A1* | 3/2003 | Damnjanovic et al. | 455/522 |
| 2004/0081115 A1* | 4/2004 | Parsa et al. | 370/320 |
| 2004/0106431 A1* | 6/2004 | Laroia et al. | 455/552.1 |
| 2004/0110521 A1* | 6/2004 | Soldani et al. | 455/509 |
| 2004/0151133 A1 | 8/2004 | Yi et al. | |
| 2004/0198294 A1* | 10/2004 | Hagin-Metzer | 455/296 |
| 2005/0030953 A1* | 2/2005 | Vasudevan et al. | 370/395.4 |
| 2005/0099989 A1 | 5/2005 | Rudolf et al. | |
| 2005/0147115 A1* | 7/2005 | Li et al. | 370/449 |
| 2005/0170782 A1* | 8/2005 | Rong et al. | 455/67.11 |
| 2005/0233754 A1 | 10/2005 | Beale | |
| 2006/0083183 A1* | 4/2006 | Teague et al. | 370/278 |
| 2006/0274712 A1* | 12/2006 | Malladi et al. | 370/345 |
| 2008/0267126 A1* | 10/2008 | Vujcic et al. | 370/330 |

OTHER PUBLICATIONS

Third Generation Partnership Project, "Technical Specification Group Radio Access Network; Physical channels and mapping of transport channels onto physical channels (TDD) (Release 6)," 3GPP TS 25.221 V6.5.0 (Sep. 2005).

Third Generation Partnership Project, "Technical Specification Group Radio Access Network; Physical channels and mapping of transport channels onto physical channels (TDD) (Release 7)," 3GPP TS 25.221 V7.1.0 (Sep. 2006).

Third Generation Partnership Project, "Technical Specification Group Radio Access Network; Physical channels and mapping of transport channels onto physical channels (TDD) (Release 7)," 3GPP TS 25.221 V7.5.0 (Nov. 2007).

Schulist et al., "Link Level Performance Results for a WCDMA Random Access Scheme with Preamble Power Ramping and Fast Acquisition Indication," IEEE Vehicular Tevchnology Conferernce, vol. 5, pp. 2581-2585 (Sep. 19, 1999).

NEC, "Use of a Shared HSPDA Channel for MBMS ptp transmission," 3GPP TSG-RAN2 Meeting #48, Tdoc R2-052023 (Aug. 29-Sep. 2, 2005).

Alcatel, "Adaaptive UE Feedback Channel for Downlink Scheduling Decision in LTE," 3GPP TSG-RAN WG 2 Meeting #50, R2-06004 (Jan. 9-13, 2006).

* cited by examiner

FAST UPLINK RESPONSE TO DOWNLINK SHARED CHANNEL TRANSMISSION WITHOUT A DEDICATED UPLINK CHANNEL

CROSS REFERENCE TO RELATED APPLICATION

This application claims the benefit of U.S. provisional application No. 60/883,735, filed Jan. 5, 2007 which is incorporated by reference as if fully set forth.

FIELD OF INVENTION

The invention relates to wireless communication.

BACKGROUND

In traditional universal mobile telecommunications systems (UMTS) or similar radio air interfaces, the control signaling of a wireless transmit/receive unit (WTRU) that is not in a connected mode, (e.g., not using a cell-dedicated channel (DCH) in a UMTS wideband code division multiple access (WCDMA) system), is transmitted on a common downlink (DL) channel such as a forward access channel (FACH) carried on a shared physical resource such as a secondary common control physical channel (S-CCPCH). Acknowledgement signals are sent on a contentious common uplink (UL) channel, (e.g., a random access channel (RACH)).

Recent changes to standards enable transmission of the downlink FACH information over a high speed downlink shared channel (HS-DSCH), previously only used for high speed downlink packet access (HSDPA) transmissions in a Cell_DCH state. The same mechanism may in the future be applied to a higher layer or to user plane data.

These changes have left the RACH as the only available uplink channel to provide uplink feedback. The RACH is a limited capacity contentious channel with small payload that in addition requires a lengthy collision resolution process. The RACH terminates in a radio network controller (RNC), which requires Iub delays.

Another method that is allowed in recent changes (but will likely not be practiced) is transmitting feedback on a dedicated channel. However, any channel that requires a power reference using a power controlled dedicated channel will severely limit the number of users that can be signaled in this mode and is not desirable.

Because of the unfeasibility of RACH or dedicated channel usage, the recent changes assume no feedback at all except for possibly low rate, averaged signal strength measurements possibly sent prior to transmissions. In particular, there are no positive acknowledgement (ACK) or negative acknowledgement (NACK) or timely channel quality indicator (CQI) measurements.

Therefore, these changes rely on multiple transmissions to achieve the required signaling reliability. The number of transmission is configured to the desired reliability but correct reception can only be verified with a radio link control (RLC) or transmission control protocol (TCP) ACK (if configured). This results in higher latency and loss of efficiency.

Therefore, a non-contentious shared uplink channel that does not require a fixed power reference or accurate time reference would be desirable.

SUMMARY

A method and apparatus for uplink transmission over a non-contentious shared feedback channel, wherein the parameters of the uplink transmission are determined by the parameters of a downlink transmission, are disclosed. A new uplink channel, called a physical shared uplink feedback channel (PSUFCH) is used for uplink transmission such as feedback information in response to a downlink transmission on a fast shared data channel. The content of the feedback information may be general, e.g. an ACK/NACK or a CQI. The PSUFCH is transmitted using power ramping that terminates upon reception of a downlink ACK (DLACK) from a Node-B. No ambiguity resolution is required due to the non-contentious and deterministic mapping of the uplink channel resources.

BRIEF DESCRIPTION OF THE DRAWINGS

A more detailed understanding may be had from the following description, given by way of example and to be understood in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
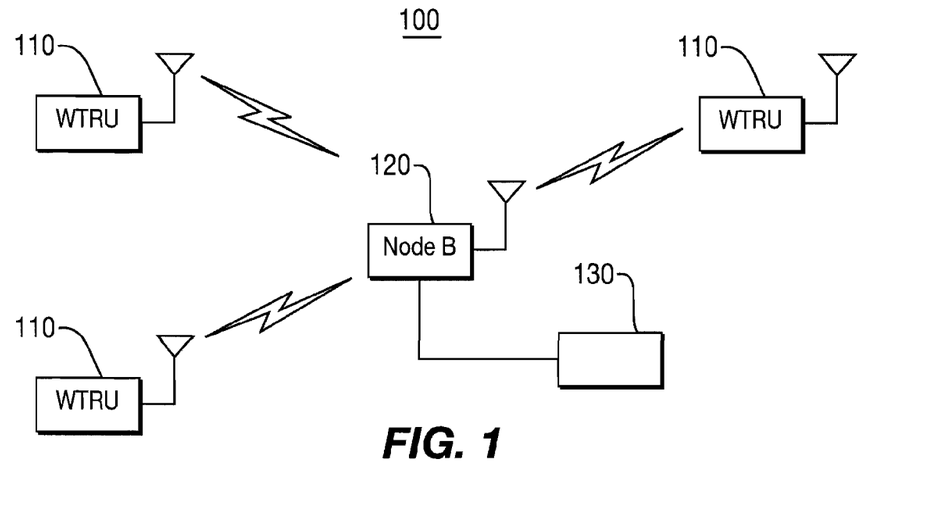
FIG. 1 shows an example wireless communication system including a plurality of WTRUs, a base station, and an RNC.
Figure 2:
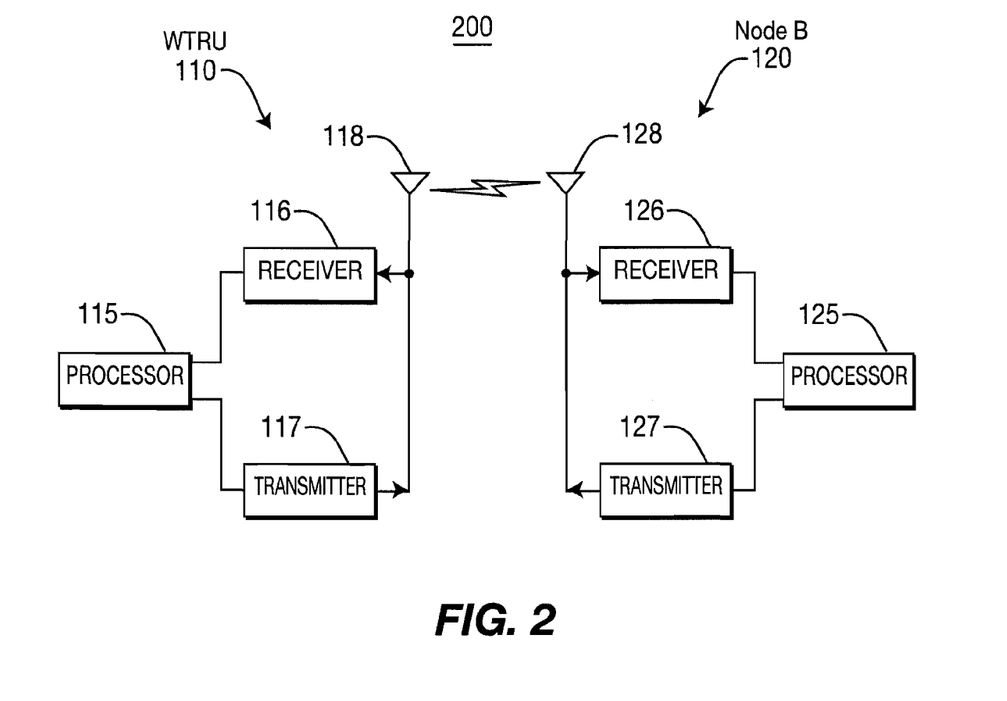
FIG. 2 is a functional block diagram of a WTRU and the base station of FIG. 1.

FIG. 1 shows a wireless communication system 100 including a plurality of WTRUs 110, a Node-B 120, and an RNC 130. As shown in FIG. 2, the WTRUs 110 are in communication with the Node-B 120, which is in communication with the RNC 130. The WTRUs 110 are configured to receive data transmissions from the Node-B 120 over a high speed shared data channel. The WTRUs 110 are configured to transmit feedback over a shared fast feedback channel, (i.e., PSUFCH). Although only three WTRUs 110, one Node-B 120, and one RNC 130 are shown in FIG. 1, it should be noted that any combination of wireless and wired devices may be included in the wireless communication system 100. For example, although the RNC 130 is shown in the wireless communication system 100, the RNC 130 may not exist in the system 100 and may be included in the Node-B 120 or any other entity in the system 100.

FIG. 2 is a functional block diagram 200 of the WTRU 110 and the Node-B 120 of FIG. 1. As shown in FIG. 1, the WTRU 110 is in communication with the Node-B 120 and both are configured to provide a fast uplink response to data or signaling sent on shared physical data channel without a dedicated uplink channel.

In addition to the components that may be found in a typical WTRU, the WTRU 110 includes a processor 115, a receiver 116, a transmitter 117, and an antenna 118. The processor 115 is configured to provide a fast uplink response to data or signaling sent on a shared physical data channel without a dedicated uplink channel. The receiver 116 and the transmitter 117 are in communication with the processor 115. The antenna 118 is in communication with both the receiver 116 and the transmitter 117 to facilitate the transmission and reception of wireless data.

In addition to the components that may be found in a typical Node-B, the Node-B 120 includes a processor 125, a receiver 126, a transmitter 127, and an antenna 128. The processor 125 is configured to provide a fast uplink response to data or signaling sent on shared physical data channel without a dedicated uplink channel. The receiver 126 and the transmitter 127 are in communication with the processor 125. The antenna 128 is in communication with both the receiver 126 and the transmitter 127 to facilitate the transmission and reception of wireless data.

Figure 3:
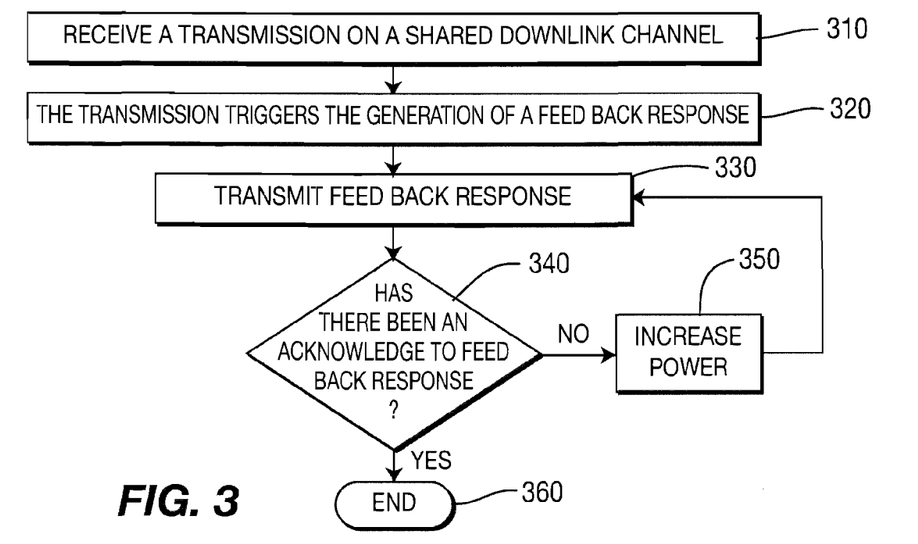
FIG. 3 is a flowchart of a process for a fast uplink response to data or signaling sent on a shared physical data channel without a dedicated uplink channel.

FIG. 3 is a flowchart showing a fast uplink response to data or signaling sent on shared physical data channel without a dedicated uplink channel. A Node-B transmits a message over a shared DL channel (step 310). Upon reception of the message, the WTRU 110 generates feedback which is described below in further detail (step 320). The feedback is transmitted to the Node-B over the Physical Shared Uplink Feedback Channel (PSUFCH) (step 330). The PSUFCH is a new channel used by a WTRU to signal information such as feedback information related to downlink transmissions on a fast shared data channel. The WTRU 110 waits for a response from the Node-B to the feedback for a predetermined period of time (step 340). If no response is received from the Node-B, the WTRU 110 increases the transmission power and resends the feedback (step 350). If a response is received, usually in the form of a DLACK, the WTRU 110 does not resend the feedback (step 360). In particular the WTRU 110 sends PSUFCH transmissions in known epochs, (e.g., periodically), and using known resources, increasing its power every time until it receives DLACK.

The WTRU 110 may be either designed or instructed by the network using L3 signaling to provide the following feedback information to Node-B 120 according to a combination of any of the following embodiments.

The WTRU 110 may provide feedback to the Node-B 120 by transmitting an ACK or a NACK as necessary following each HS-DSPCH sub-frame. In this case either the ACK or NACK may be implicit while the other one of the two is sent explicitly, (e.g. a transmission may be taken by Node-B 120 to be ACK and its absence a NACK).

Alternatively, the WTRU 110 may provide feedback to the Node-B 120 by transmitting a channel quality indicator (CQI) upon improper reception of a message from the Node-B, and cease transmission if reception was proper, wherein a CQI may be interpreted as NACK.

The WTRU 110 may also provide feedback to the Node-B 120 by transmitting a CQI upon proper reception of a message from the Node-B 120, and cease transmission if reception was improper, wherein a CQI may be interpreted as ACK.

Alternatively, the WTRU 110 may provide feedback to the Node-B by transmitting an ACK/NACK, ACK, NACK or CQI following every transmission received from the Node-B, or by transmitting same only after some of the downlink transmissions based on pre-defined higher layer rules that are not tied to the data transmission to the WTRU 110. Such rules may include pre-scheduled timed transmission, polling by the Node-B 120, (e.g., using dummy downlink transmissions), and rules tied to the statistics of the data sent to the WTRU 110 (average data rate, data load per packet, number of retransmissions required, block error rate (BLER), average retransmission delay, etc.). The nature of the CQI may be defined differently depending on the rule used. For example, the CQI may vary between an instantaneous statistic, a short-term statistic and a long-term statistic. Another possibility is to transmit the CQI in two parts, the first part containing the $N_m$ most significant bits (MSB) and the second containing the $N_l$ least significant bits (LSB). These two parts may be transmitted at different times and different intervals, (e.g., (e.g. the second part could be transmitted more frequently to track fine variations of channel quality).

Alternatively PSUFCH transmissions may be triggered by HS-SCCH transmission alone without data contents (also known as HS-SCCH orders). The type of feedback may depend on the HS-SCCH contents. In this case the resources that are used for PSUFCH are determined by the HS-SCCH code, the WTRU ID, a field in the HS-SCCH or their combination.

The WTRU 110 may also provide feedback to the Node-B 120 by transmitting a block of the ACK/NACK or transmitting statistical information about the ACK/NACK based on pre-defined higher layer rules that are not tied to the data transmission to the WTRU. Such rules may include pre-scheduled timed transmission, polling by the Node-B 120 and/or rules tied to the statistics of the data sent to the WTRU 110 (average data rate, data load per packet, number of retransmissions required, BLER, average retransmission delay, etc.). The nature of the ACK/NACK block transmission may be defined in several different ways: an actual block of the ACK/NACK (in which case each may be associated with a specific packet), or a statistical value(s) derived from such a block: e.g. average, a measure of clustering of the ACKs or the NACKs, etc. In case an actual block of the ACK/NACK is transmitted, the set of downlink transmissions associated with this block of the ACK/NACK may be implicitly defined by the transmission times of the current and previous transmissions.

Another example of feedback to the Node-B is transmitting a WTRU identification (ID) (possibly compressed), a hybrid Automatic Repeat Request (HARQ) process number, or both. It may be advantageous to have the WTRU ID and HARQ present for processing in the WTRU. However, this does not negate the need for immediate association of an UL signal with a particular DL packet transmitted.

In addition, the WTRU 110 may use the PSUFCH to transmit an indication of uplink bandwidth request. The request may comprise a properly quantized buffer occupancy, happy bit, etc., and may include an indication of the type of service or to request transition to cell-DCH. The request may be transmitted as a response to polling from the Node-B 120 or attached to other feedback (such as the ACK/NACK/CQI described above). The WTRU 110 may also use the PSUFCH to transmit higher layer responses, (e.g., transmission control protocol (TCP) ACKs), or application layer responses. Additionally, the WTRU 110 may use the PSUFCH to provide specific power control feedback for downlink channels.

Some of the information types for the feedback may include responses to DL information while others may include responses to polling by a Node-B. Polling by a Node-B may be explicit or implicit. Polling may comprise, for example, transmission of a dummy high-speed physical downlink shared channel (HS-PDSCH) packet with a valid cyclic redundancy check (CRC) and WTRU ID but with a null protocol data unit (PDU) ID. An alternative polling method includes the use of duplicate WTRU IDs that are understood by the WTRU 110 as polling. In the alternative, the insertion of a "null MCS" into the HS-SCCH downlink transmission that is understood by the WTRU 110 as polling. In this case there is no HS-PDSCH transmission. The PSUFCH timing may then correspond to either HS-SCCH or HS-PDSCH timing. Other PSUFCH parameters may be determined by the codes that would have been used for HS-PDSCH if it was not null.

In all cases, the information may be encoded in such manner as to provide the Node-B with positive error detection, e.g., cyclic redundancy checks (CRC).

The PSUFCH is described with respect to the DL HS-PDSCH for which it may be providing feedback. It is assumed that in the HS-PDSCH multiple transmissions may occur in time periods known as transmission time intervals (TTI) or sub-frames and the duration of each transmission is known. For simplicity, it is assumed here that the duration is fixed, (although this is not required). Secondly it is assumed that the TTIs are partitioned into smaller time intervals which are referred to as radio slots or simply slots. And the HS-PDSCH uses several channel resources, (e.g., spreading codes in WCDMA). These channel resources may be shared between the WTRUs with one or several allocated to a particular WTRU.

The HS-PDSCH, up to a given number $N_{PDU/TTI}$ of PDUs, may be transmitted to the same WTRU in the same TTI.

The PSUFCH is characterized by the following basic parameters: 1) a set of physical channel resources, such as scrambling codes, spreading codes or signatures, preconfigured by the network; 2) a set of transmission periods, predetermined by the network and chosen by the WTRU based on the specific information to be sent and according to the rules defined by the network; 3) the duration of each of these transmission periods; 4) a power ramp up procedure configured by the network; and 5) whether or not an L3 RACH transmission also needs to take place, and if so, the procedures described in this section are modified according to special rules, as discussed below.

The detailed configuration of the PSUFCH is explained by example in a WCDMA system. The basic physical channel resource is a scrambling code (or a combination of scrambling/spreading codes) and possibly signature. The configuration selection from a predefined set may be based on the TTI and a spreading code, or codes derived from a WTRU ID, a scrambling index. If the configuration selection is based on the TTI and spreading code used for the HS-PDSCH, the mapping may be signaled by the network. Scrambling codes and or signatures may be repeated in the cell but only after a sufficient time so that no two WTRUs use the same scrambling/signature code at the same time. For the purpose of this invention we also assume that different scrambling codes are used in different cells. Response times are arranged so that the WTRU 110 may respond to several PDUs at different times without transmitting multiple scrambling codes at the same time. Alternatively if codes are derived from a WTRU ID, (e.g. HS-DSCH Radio Network Temporary Identifier (H-RNTI), scrambling code, etc.), a PDU or HARQ sequence number must be included in the payload.

If WTRU-specific scrambling codes are used, a differentiation is made between HS-SCCHs and TTIs for a given WTRU by using different spreading codes, reducing the number of required scrambling codes.

The duration of the PSUFCH is configured by the network, using the parameters $L_{PSUFCH}$ and $N_{PSUFCH}$, where $L_{PSUFCH}$ is the number of slots to be transmitted in one PSUFCH transmission and $N_{PSUFCH}$ is the maximum number of such transmissions. A guard band may be utilized as part of each PSUFCH transmission. Each such transmission is referred to as a PSUFCH TTI or just a TTI whenever this is not ambiguous. Note that the duration of this TTI may be different then the duration of HS-PDSCH TTI. The PSUFCH power-ramp consists of a number $N_{PSUFCH}$ PSUFCH TTIs which are not necessarily contiguous, but rather separated by $N_{SEP}$ TTIs, $N_{SEP} \geq 0$. An additional data transmission duration of one TTI may be present and is transmitted only if a DLACK is received according to rules specified below.

The PSUFCH configuration information is set up using any combination of the existing HS-SCCH slot format, the MAC-hs header format, or the broadcast and sent as a part of the system information when the HSDPA channel is set up, and a new L1 physical signal or L2 control channel in the downlink.

The duration of the PSUFCH depends on the content and the configuration of the channel. Three content categories are recognized PSUFCH-short, PSUFCH-long, and PSUFCH-medium which are described in detail below.

The PSUFCH-short is a one-bit feedback transmission, typically used for ACK/NACK or an incremental CQI update. No data transmission is present, i.e. only a ramp-up is used.

PSUFCH-long is a transmission of a "large" number of bits that will require a PSUFCH message. The PSUFCH message is transmitted in a data TTI following a ramp-up procedure. The approach may be further extended by providing an indication as to the amount of data a WTRU needs to transmit, either in terms of bits or data TTIs. The information may be provided within the power ramp-up procedure, which saves a WTRU from undergoing multiple ramp ups once it has already acquired the uplink channel. The number of data TTIs requested should be restricted to be less than some maximum (e.g., 10 sub-frames) in order to guarantee that the WTRU 110 remains effectively power controlled. The WTRU 110 may also provide quantized and coded level information, as shown in Table 1. The Node-B may then refrain from assigning the scrambling code to other WTRUs for the requested number of Data TTIs.

TABLE 1

| Number of TTIs requested | Coded level information |
| --- | --- |
| 2-4 Data TTIs | 00 |
| 4-6 Data TTIs | 01 |
| 6-8 Data TTIs | 10 |
| 8-10 Data TTIs | 11 |

PSUFCH-medium is a transmission of up to M bits, which may be useful for a full CQI transmission, or a compressed or delta CQI with ACK/NACK or a block ACK/NACK. The value for M is typically a low integer, such as 6. Depending on network configuration a PSUFCH-medium configuration is either identical to that of PSUFCH-long or a modified PSUFCH-short.

The initial transmission power at which the WTRU 110 transmits the PSUFCH may be based on the received power by the WTRU measured on some appropriate reference channel (e.g. Common Pilot Channel (CPICH) or HS-PDSCH) and a network-supplied offset, wherein the offset is part of the system information for the service. Alternatively, the initial transmission power may also be based on the network instructions which specify absolute power to use, and provide rules on allowed timing for the feedback, i.e., if the received reference channel power is above a certain value, the WTRU 110 would not be permitted to send feedback. Additionally, a subsequent power ramping could use a network signaled increment and/or the existing HS-SCCH may be modified to include PSUFCH transmission power control information. In another alternative, a power offset or relative power command (e.g. increase/decrease) bits could be introduced in the HS-SCCH to adjust the PSUFCH transmission power.

When the WTRU 110 reaches a maximum power, as defined by the network, there are two alternatives for WTRU behavior. The WTRU 110 may continue with PSUFCH transmissions at a maximum power level, or in the alternative the WTRU 110 may cease transmission. If the WTRU 110 receives a DLACK in response to the transmission, the WTRU immediately ceases power ramp up transmissions. If no data interval is to be sent, the PSUFCH transmission is complete. If a data interval is to be transmitted in response to a DLACK, each TTI of the power-ramp up interval is characterized by a scrambling code, and potentially a spreading code as specified above. The power-ramp up interval may further consist of signature sequences which are modulated onto the spreading/scrambling code as specified above. The signature sequences are defined to be easily distinguishable (e.g. orthogonal), using for example, the preamble structure of the P-RACH preamble as defined in 25.211 and 25.213, which consists of signature sequences.

The use of signature sequences is, however, optional. Alternatively when short/medium transmissions are used the information may be appropriately coded (e.g., by using short block codes), modulated onto the physical resource (i.e. spread with the spreading/scrambling code) and transmitted as uplink data on ramped-up retransmissions.

Figure 4:
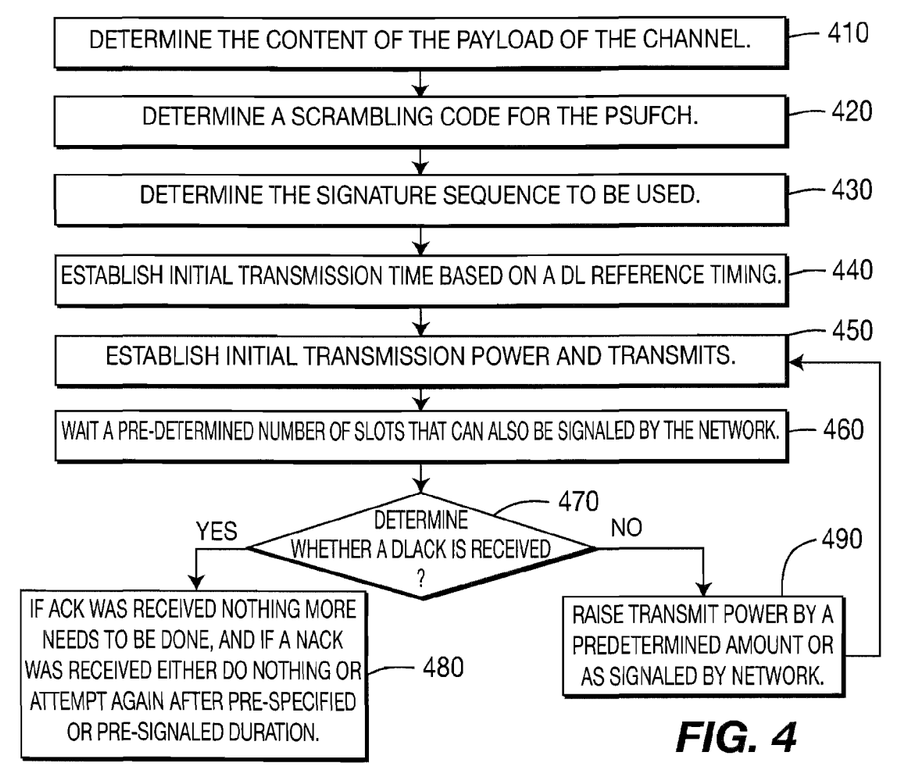
FIG. 4 is a flowchart of a physical shared uplink feedback channel (PSUFCH)-short procedure.
Figure 5:
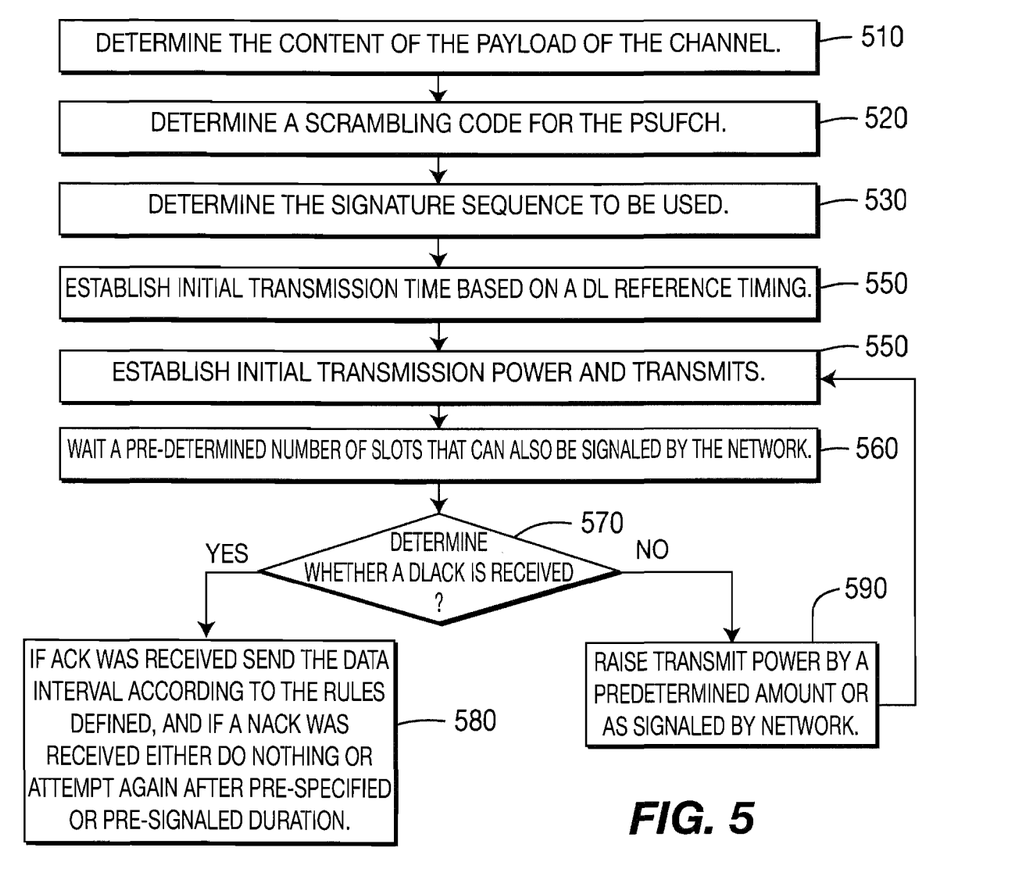
FIG. 5 is a flowchart of a PSUFCH-long procedure.

FIG. 4 shows a PSUFCH-short procedure. Upon reception of an HS-PDSCH or poll, the WTRU determines the content of the payload of the channel (step 410). Then it determines a scrambling code for the PSUFCH (step 420). Next it determines the signature sequence to be used (step 430). Then it establishes initial transmission time based on a downlink reference timing with possible offset signaled by the network (step 440) and establishes initial transmission power and transmits (step 450). After transmission, it waits a predetermined number of slots that may also be signaled by the network (step 460). If a DLACK is received, a determination is made at step 470 as to whether the DLACK is an ACK or a NACK; if ACK was received nothing more needs to be done, and if a NACK was received, it may either do nothing or attempt again after pre-specified or pre-signaled duration (step 480). If no DLACK is received, the WTRU 110 raises the transmit power by a predetermined amount or as signaled by network (step 490) and repeats step 450-490 up to a maximum of a given number of iterations or max power (determined from $N_{PSUFCH}$). A downlink retransmission of same PDU may occur before the WTRU has succeeded in ramping up. Depending on the application, the WTRU will take different actions which may include: abandon the previous information, and sending new information with current power level using new scrambling code. Alternatively it may abandon the information, and do nothing. Or it may complete the procedure. Different PDUs, whether or not belonging to same MAC flow, are treated independently FIG. 5 shows a procedure for PSUFCH-long. Upon reception of an HS-PDSCH or poll and in order to send one of the responses determined above to Node-B, the WTRU 110 first determines the content of the payload of the channel 510. Next a scrambling code is determined for the PSUFCH 520. Then a signature sequence to be used is determined 530. An initial transmission time is established 540; the initial transmission time may be based on the downlink reference timing with possible offset signaled by the network. Then an initial transmission power is established and transmission occurs 550. Next, the WTRU 110 waits a predetermined number of slots 560. A determination is made whether a DLACK (either ACK or NACK) is received 570. If an ACK was received data interval is transmitted 580. If a NACK was received (in 570), the WTRU 110 may choose to do nothing or attempt again after pre-specified or pre-signaled duration 580. Course of action may be determined by network signaling. However, if a DLACK is not received, the WTRU 110 increases the transmission power by a predetermined amount or as signaled by network and repeats 550 and 560 to a maximum of a given number of iterations or max power (determined from $N_{PSUFCH}$). A downlink retransmission of the same PDU may occur before the WTRU 110 has succeeded in ramping up. Depending on the application, the WTRU 110 may abandon the previous information, and transmit new information with current power level using new scrambling code. Alternatively, the WTRU 110 may abandon the information and take no further action. Or the WTRU 110 may complete the procedure.

The PSUFCH-medium transmission follows either the PSUFCH-short or the PSUFCH-long procedure depending on whether a data transmission is required following the reception of a DLACK. Additionally, the transmission of a PSUFCH-medium may be triggered by downlink HS-PDSCH events and thus may be used to signal an additional one bit value (such as ACK/NACK), where one of two possible values is signaled implicitly.

For PSUFCH-long transmissions signature sequences are selected such that the signatures are different from the previous M transmissions by the WTRU 110. This permits sharing of physical channel resources between different transmissions within a WTRU, by the use of the same resource for all such transmissions. Alternatively for PSUFCH-long transmissions the signature sequences are selected at random. This permits sharing of physical channel resources between several WTRUs as contention is reduced through such a selection. In case signatures are selected at random, the DLACK (by e.g. using AICH) may resolve the resulting ambiguity by signaling a NACK. Note however that this method may (depending on the definition of the resource sets) introduce contention.

In both cases above the Node-B ACKs or NACKs on the DLACK and may be used to prevent collisions among data interval transmissions. The WTRU 110 may select one or more signatures out of a subset of signatures. Both subset and signature may depend on the downlink resources in a manner signaled by the network. Alternatively a signature sequence is selected at random from a pre-defined or network signaled set. Note however that this method may (depending on the definition of the resource sets) introduce contention.

For a PSUFCH-short transmission, if both an ACK and a NACK are sent explicitly, then the information is modulated on the selected signature sequence(s). If the transmission of either ACK or NACK is implicit, the presence of the transmission itself will represent the explicitly transmitted data. Any other one-bit information is transmitted in the short format in a similar fashion.

For PSUFCH-medium transmission without a data-interval a set of L signature sequences is selected. The data is then modulated on this set using some modulation scheme, (e.g., Multi-dimensional binary phase shift keying (BPSK), orthogonal modulation, Bi-orthogonal modulation, etc.) The modulation scheme may require that one of the signatures is assigned as a reference for phase and/or power. The selection of which is the phase reference could be signaled from the network. The selection of carriers to be modulated may be fixed or randomization may be allowed. However, randomization may significantly impact the performance of the receiver when certain modulation schemes are used and is therefore undesirable in most cases.

The following describes specifically how certain modulation schemes may be used within the context of transmission of PSUFCH-medium format information without a data TTI. It is assumed that M bits are to be transmitted and that signatures are exactly orthogonal at the transmitter, while the exact orthogonality can be relaxed, performance will be impacted.

In a multi-dimensional m-PSK modulation scheme (including BPSK (m=2), QPSK (m=4)), where m is an integer power of 2. The number of data carriers required can be determined by the equation $M/\log_2 m$. An additional phase reference signature is required. The randomized selection of signature is allowed, however it has some performance impact.

In a multi-dimensional m-QAM modulation scheme, (including BPSK (m=2), QPSK (m=4)), where m is an integer power of two, the number of data carriers required can be determined by the equation $M/\log_2 m$. An additional phase reference signature is required. A randomized selection of signature is allowed, however it may have a performance impact.

In an m-ary orthogonal modulation scheme, the number of data carriers required can be given by M (i.e. m=M). An additional phase reference signature is not needed. The randomized selection of a signature is not allowed.

In an m-ary bi-orthogonal modulation scheme, the number of data carriers required is given by the equation M/2 (i.e. m=M/2). An additional phase reference signature is required. The randomized selection of the signature is not allowed.

In a multi-dimensional on-off keying modulation scheme (i.e. M/2 carriers are either with or without power), the number of data carriers required is given by M/2 (i.e. m=M/2). An additional phase reference signature is not required. And the randomized selection of the signature is not allowed.

If a new PSUFCH transmission is needed while another one is on-going, the new transmission may start at the power reached by the on-going transmission. This may conserve resources and network capacity on transmission at power that is known to be undetectable to the network. Additionally it may behave as if the skipped transmissions actually occurred. And additionally it does not violate the set power limits.

For example, power ramp-up parameters are signaled via RRC signaling and are typically fixed. Based on the power ramp-up parameters, the $N_{PRE}$, the Initial PSUFCH power (Pinit), and the Power increment (deltaP) may be available either directly or via computation. Wherein the $N_{PRE}$ is the maximum number of preambles that may be sent.

The overlapping PSUFCHs are addressed by maintaining a common timed PSUFCH counter. Let Fcount be the PSUFCH counter and where the value is set to 0 when there are no PSUFCH transmissions. Let Ftimer be the PSUFCH counter timer and let it be reset (set to 0) if there are no PSUFCH transmissions going on. If there are no active PSUFCH transmissions going on and a new one is required, the PSUFCH timer is started. The instantaneous power of any PSUFCH transmission is computed as follows:

$$Pnow = Pinit + (deltaP * Fcount)$$

If Ftimer reaches (PSUFCH TTI)*($N_{SEP}$+1), the Fcount is incremented by one, and Ftimer is reset to 0. If Fcount=$N_{PRE}$, the transmissions of all PSUFCH are abandoned.

In the current WCDMA standard, simultaneous transmission of RACH and PSUFCH requires the WTRU 110 to transmit on two different scrambling codes, which is undesirable. Three modifications to the transmission rules are hereby proposed to prevent the transmission on two different scrambling codes. The first comprises the use of PSUFCH-medium transmission with no data interval, where one data bit is reserved as an indicator permitting the double use of the PSUFCH power ramp-up as a RACH power-ramp up. The DLACK serves as the AICH for the RACH. The second modification comprises a modification to the downlink transmission intervals which leave room for RACH ramp-up procedure (this is convenient if FACH used for SRB). And thirdly, the WTRU 110 may abandon PSUFCH and perform RACH power ramp-up only, and use the RACH message power-control preamble for the PSUFCH-short and PSUFCH-medium data and include PSUFCH-long data in the RACH message.

The following section describes a particular mapping of downlink HS-PDSCH resources to PSUFCH and the DLACK. An F-AICH channel is defined for the PSUFCH and this channel carries the DLACK. This channel uses several spreading codes and each transmission is structured in the same manner as the AICH.

Figure 6:
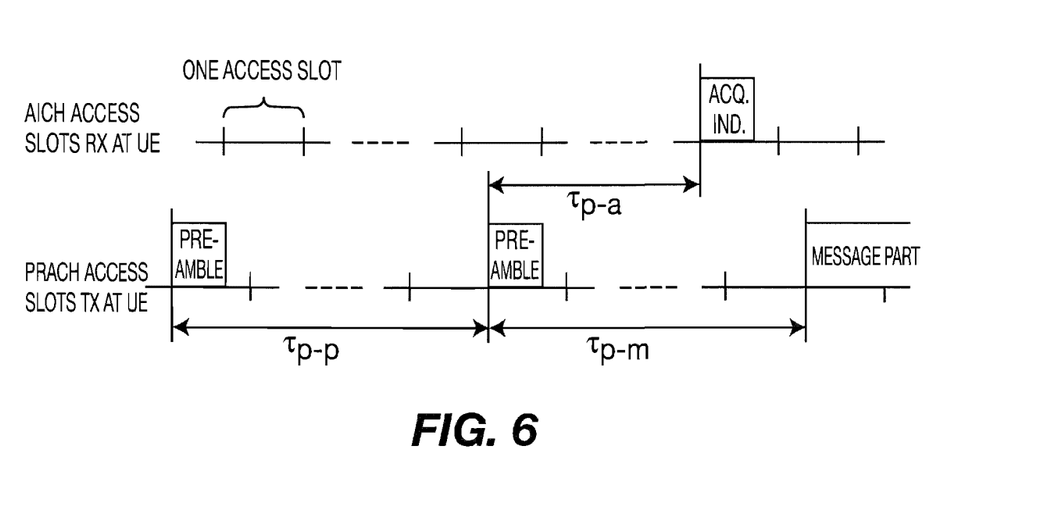
FIG. 6 shows a timing relationship between a physical random access channel (PRACH) and an acquisition indicator channel (AICH)

The PSUFCH/F-AICH relationship is based on the structure of the PRACH preamble and the associated AICH ACK/NACK feedback as currently specified. FIG. 6 depicts the relation-ship between PRACH preambles and AICH. In a typical realization, the preamble to preamble time is six slots while the preamble to AICH timing is three slots. The relationship between PSUFCH preambles and F-AICH including power ramp up is further illustrated using FIG. 7.

The scrambling code duration (SCD) is the time during which a scrambling code is used as a basis for different preamble signatures. The minimum duration is determined by the PSUFCH/F-AICH (equivalently PRACH/AICH) turn around and allowed number of repetitions as defined by the network.

The scrambling code access window (SCAW) is the time during which an initial preamble may be sent.

Figure 7:
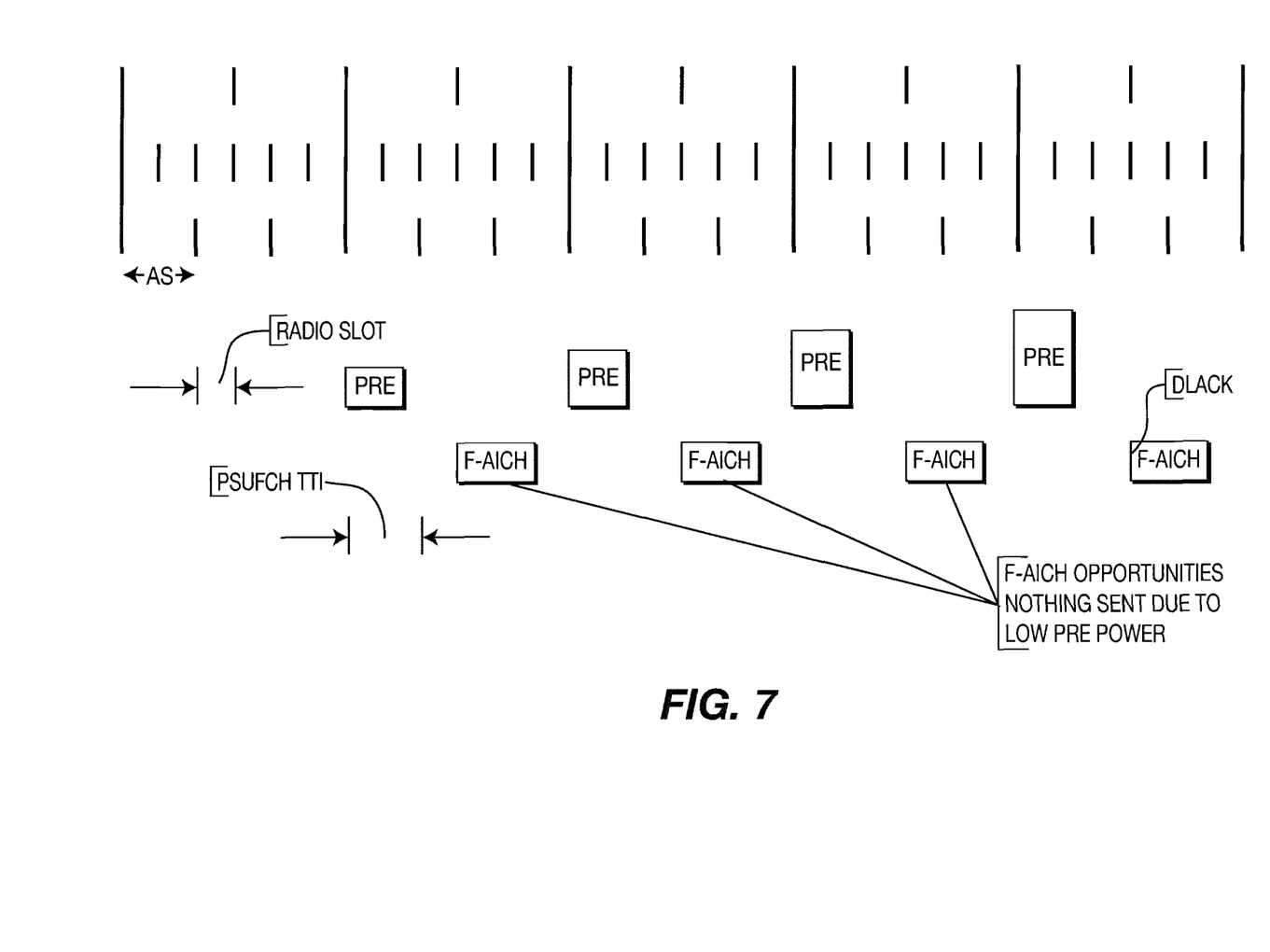
FIG. 7 shows an example PSUFCH/F-AICH timing with power-ramp up.

The F-AICH access slot duration, is the duration during which a single F-AICH is transmitted (for AICH, the access slot is two radio slots). FIG. 7 illustrates a structure where the PSUFCH TTI and F-AICH access slot durations are consistent with definitions of PRACH preamble and AICH.

Table 2 shows the notation used to determine the number of uplink scrambling codes required and the number of F-AICH codes required.

TABLE 2

| Parameter | Description |
|---|---|
| $T_{SCAW}$ | the SCAW duration. |
| $T_{SCD}$ | the SCD duration. |
| $T_{RT}$ | the re-transmission time for a preamble - i.e. elapsed time between starts of subsequent preamble transmission. |
| R1 | the ratio between the HSDPA TTI and PSUFCH TTI. |
| R2 | the ratio between the PSUFCH TTI and the F-AICH Access Slot. |
| $N_{HSDPA}$ | the number of spreading codes utilized for downlink HSDPA. |
| $N_{UL-SIG}$ | the number of signatures available to each WTRU for differentiation of transmission. |
| $N_{DL-SIG}$ | the number of AICH signatures available for F-AICH for differentiation of transmissions. |
| $N_{PRE}$ | The number of preambles that may be transmitted. |
| $N_{ULSCR}$ | the number of different uplink scrambling codes required. |
| $N_{F-AICH}$ | the number of different downlink spreading codes required for F-AICH. |

It follows that:

$$N_{PRE} = \left\lfloor \frac{T_{SCD}}{T_{RT}} \right\rfloor - \left\lceil \frac{T_{SCAW}}{T_{RT}} \right\rceil;\quad \text{Equation (1)}$$

$$N_{ULSCR} = \left\lceil \frac{N_{HSDPA}T_{SCD}}{N_{UL\text{-}SIG}T_{SCAW}R1} \right\rceil;\quad \text{Equation (2)}$$

$$N_{F\text{-}AICH} = \left\lceil \frac{N_{ULSCR}N_{UL\text{-}SIG}}{N_{DL\text{-}SIG}R2} \right\rceil;\quad \text{Equation (3)}$$

where the notation $\lfloor x \rfloor$ is the "floor" of x, (i.e., the largest integer less then or equal to the real value x), and $\lceil x \rceil$ is the ceiling of x, (i.e., the smallest integer that is greater then or equal to the real value x).

Such a relationship ensures that a one-to-one correspondence between downlink HSDPA PDUs, uplink scrambling codes and signatures and downlink F-AICH spreading codes is possible. The details of the association are specified by the network and depend on the exact implementation of the PSUFCH/F-AICH structure.

Figure 8:
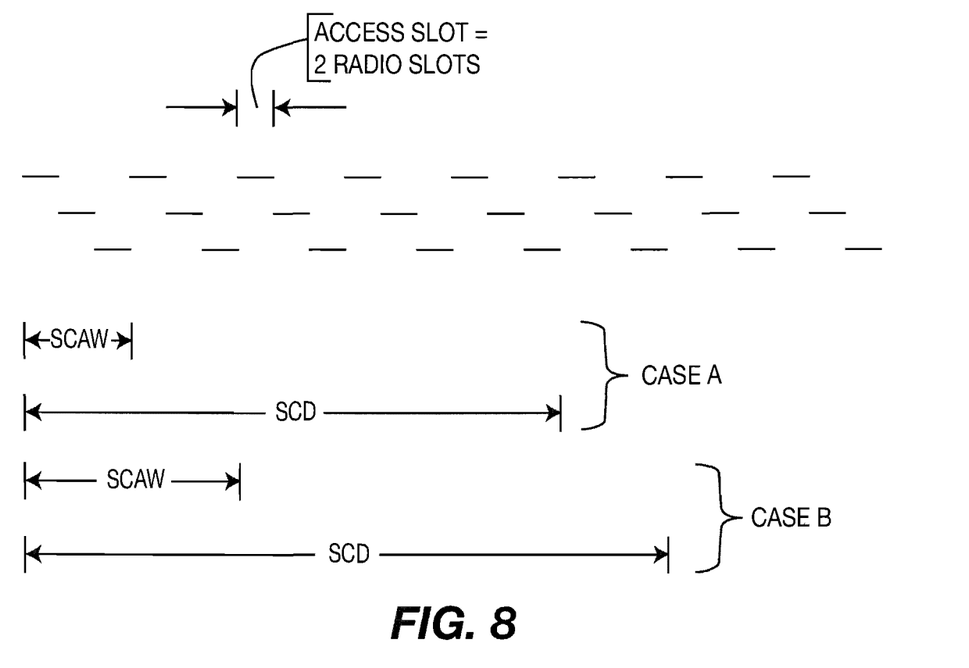
FIG. 8 shows examples of scrambling code access window (SCAW) and scrambling code duration (SCD)

Some examples are analyzed using the two configurations shown in FIG. 8. Moreover, most of the other parameters are made consistent with the PRACH preamble/AICH configuration. Thus, the PSUFCH TTI and F-AICH are both equal to two radio slots. The $T_{RT}$ is equal to 6 radio slots. Thus, R1=1.5 and R2=1. And the $N_{DL\text{-}SIG}$=16. In each case, four preamble retransmissions are allowed ($N_{PRE}$=4), which is enabled using the following two SCD/SCAW configurations, Case A and Case B. In Case A the SCD=30 slots, and the SCAW=6 slots. In Case B, the SCD=36 slots, and the SCAW=12 slots.

In some cases the WTRUs may be limited in detecting an AICH signature from amongst multiple signatures. Because one DLACK is sent for several ramp-up periods, the number of simultaneous AICH signatures is not typically large. Reducing the number of AICH signatures further may reduce the number of PDUs that may be transmitted per TTI.

Figure 9:
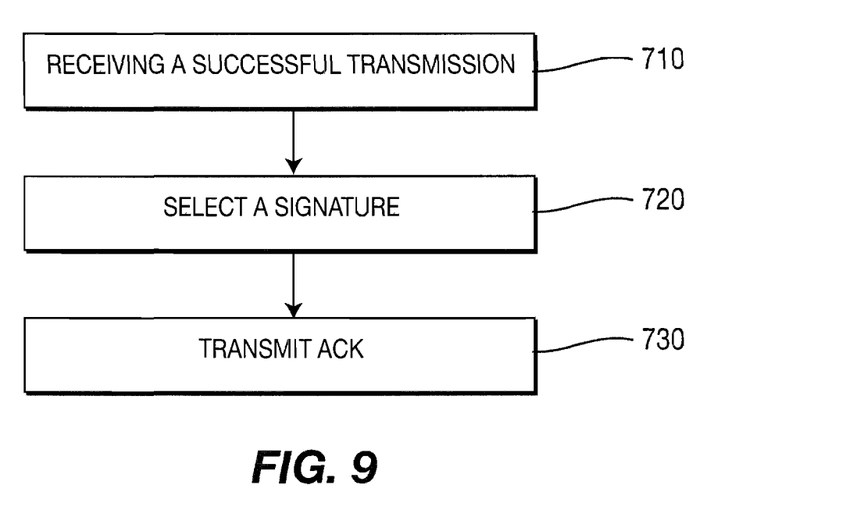
FIG. 9 is a flow chart of a method of sending an uplink ACK only when successful, using PSUFCH-short.

FIG. 9 is a flow chart of a method of sending an uplink ACK only when successful, using PSUFCH-short. The PSUFCH TTI is set to 5120 chips and the PSUFCH duration is set to 4096 chips. Thus, a guard interval of 1024 chips is used. The WTRU receives a successful transmission from the Node-B (910). A PRACH-like signature that is either deterministically or randomly selected (920). An ACK is transmitted using the PRACH-like signature (930), no PSUFCH spreading code is used. The signature is sent with a deterministically selected scrambling code described below.

Figure 10:
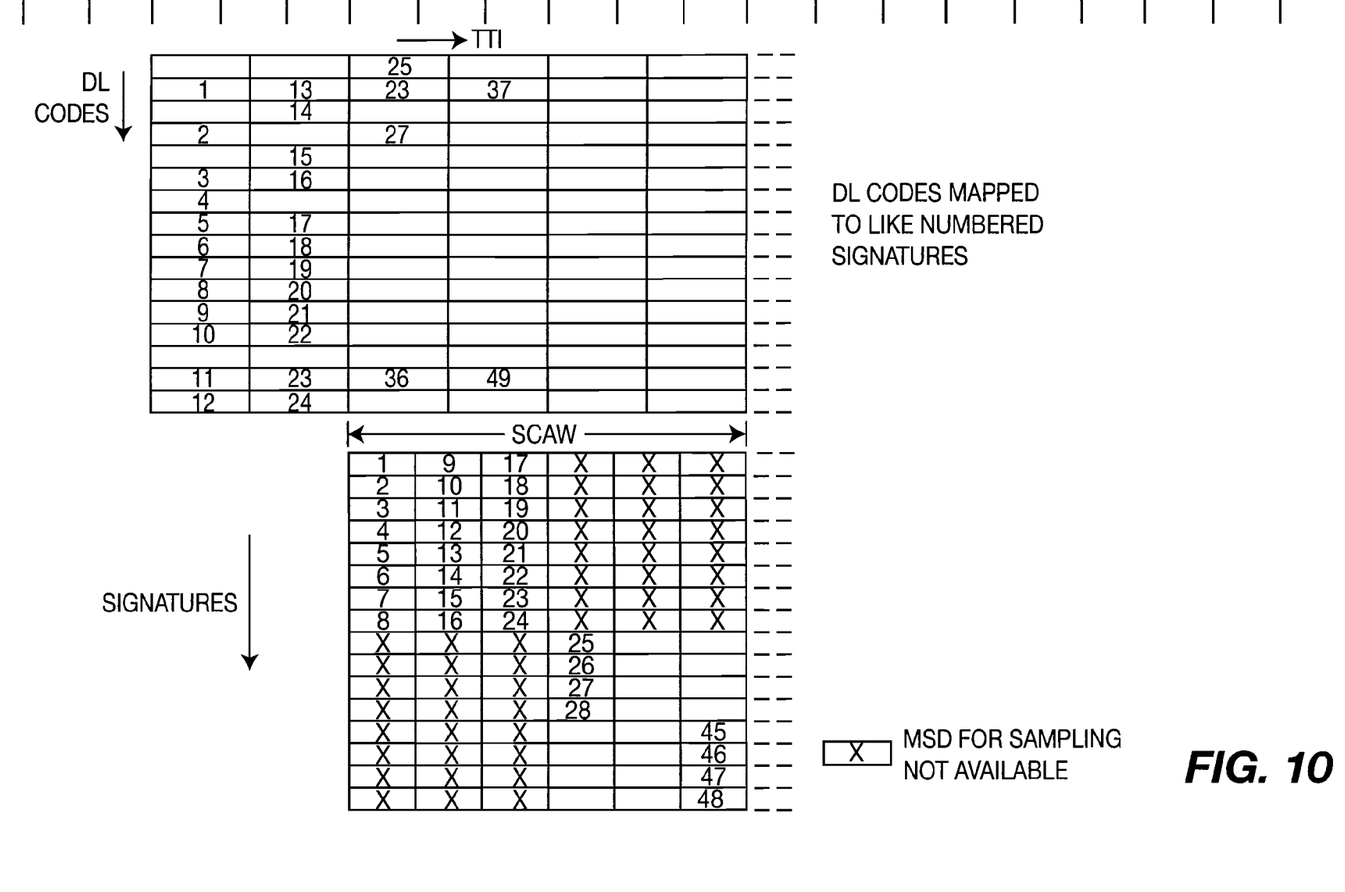
FIG. 10 shows an example of mapping of downlink (DL) codes to uplink (UL) PRACH signatures.

For deterministically selecting a scrambling code, the F-AICH signature may match the preamble signature or if preambles are transmitted on more then a single scrambling code then AICH spreading code is matched to the scrambling code. The scrambling code is then selected based on which SCAW is open at a time that is determined by the downlink event that triggers the feedback (e.g., the downlink TTI time) with an appropriate delay. The PRACH-like signature may be determined by either the TTI and HS-PDSCH code, or by the codes of the PDU. If multiple HS-PDSCH codes are used, the network may signal which code should be taken into account (e.g. lowest or whichever falls on a previously defined value). Thus, for example, a Node-B may broadcast which 12 HS-PDSCH codes correspond to which preamble signatures. For each PDU that includes at least one code, then the code will indicate the signature. If no codes are included then no ACK is sent. This example is depicted in FIG. 10 for Case B SCD/SCAW configuration. 1. This enables an almost arbitrary allocation of signatures per PDU that enables more information than just ACK.

Referring to FIG. 10, let NHSDPA=12, and let $N_{UL\text{-}SIG}$=16. If $N_{HSDPA}$ and $N_{UL\text{-}SIG}$ are entered into Equation (2) and Equation (3) and using other parameters in an example setup, the result shows that two uplink scrambling codes and two F-AICH spreading codes are sufficient. Using Case A (SCD=30 slots, SCAW=6 slots) and permit up to 16 simultaneous HSDPA PDUs. Use 16 uplink signatures. Then, using Equation (2) and Equation (3) and other parameters, four uplink scrambling codes a F-AICH spreading codes are required.

In this embodiment, a PSUFCH-medium transmission of M CQI bits is signaled to the Node-B. The value M is preferably less than 16 and there are 16 preamble signatures are used. No data TTI is used, the bits are sent directly in the ramp-up PSUFCH TTI. Because the Node-B will be required to detect the transmission and demodulate it, use of signatures for transmission differentiation in the uplink is not desired.

The CQI transmission is not scheduled, but rather triggered by a reception of a downlink HS-PDSCH TTI. Thus the transmission of CQI represents an explicit transmission of an ACK or a NACK, with the silence representing an explicit transmission of the other. In this case there are two options. In the first option, the CQI is sent after a successful reception of HS-PDSCH TTI. Thus, such a transmission is an explicit ACK and the NACK is implicit. Alternatively, in a second option the CQI is transmitted after a non-successful reception of HS-PDSCH TTI. Thus, such a transmission is an explicit NACK and the ACK is implicit.

The selection rules for slots, signatures or scrambling codes/spreading codes may be further modified by network signaled information e.g. on the HS-SCCH.

Finally, the transmission and timing of the downlink ACK is addressed as follows. The procedure is similar to that as described above, however it must be considered that preamble signatures are no longer available for WTRU differentiation. Therefore, first the DLACK uses dedicated DL spreading codes, each transmitting an F-AICH signal which is the same in structure as the ACK. The same F-AICH configuration and thus the same number of spreading codes may be used.

Sending CQI when polled/scheduled by a Node-B

In this embodiment, a CQI is requested via Node-B polling (via MAC/RRC signaling) or is to be transmitted according to a schedule or PHY level signaling. The Node-B expects the transmission and does not rely on it for ACK/NACK, thus signatures may be used to differentiate transmission. A similar configuration is used as described above, except that sharing of the signature space is utilized to reduce the number of uplink scrambling codes required. For example, with 16 total signatures, a seven-bit CQI may be transmitted using seven-dimensional BPSK and one reference signature. Since only eight signatures are required per transmission, the total number of scrambling codes required is reduced by a factor of two compared to the above section.

Although the features and elements are described in particular combinations, each feature or element may be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising:
a processor and a transmitter configured to transmit control information on a physical uplink channel;
wherein in response to a receiver receiving a transmission for the WTRU in a downlink shared channel in a first transmission time interval (TTI), the processor and the transmitter are configured to transmit on the physical uplink channel in a second TTI to indicate an acknowledgement or a negative acknowledgement;
wherein the processor and the transmitter are configured to transmit channel quality information periodically in TTIs, as periodic TTIs, on the physical uplink channel, wherein the channel quality information includes a delta channel quality information value;
wherein in response to the second TTI overlapping with one of the periodic TTIs, as an overlapping TTI, the processor and transmitter are configured to selectively include or drop an indication of the channel quality information in the overlapping TTI on the physical uplink channel based on predefined rules established by a higher layer;
wherein in response to the second TTI not overlapping with one of the periodic TTIs of the channel quality information, the processor and the transmitter transmit an indication of the acknowledgement or negative acknowledgement and not an indication of the channel quality information on the physical uplink channel; and
wherein the physical uplink channel is not a random access channel.

2. The WTRU of claim 1 wherein the physical uplink channel is shared by a plurality of WTRUs.

3. The WTRU of claim 1 wherein the processor and the transmitter are further configured to transmit in a TTI an indication of a request for uplink bandwidth on the physical uplink channel.

4. The WTRU of claim 3 wherein the processor and the transmitter are further configured in a TTI to not transmit on the physical uplink channel in response to not sending an indication of an acknowledgement, a negative acknowledgement, channel quality information or the request for uplink bandwidth.

5. The WTRU of claim 1 wherein the transmissions on the physical uplink channel have a varying number of bits.

6. The WTRU of claim 1 wherein the transmissions on the physical uplink channel have a plurality of formats having a varying number of bits.

7. The WTRU of claim 1 wherein the receiver and the processor are configured to receive physical channel resource parameters for the physical uplink channel transmissions.

8. A method comprising:
in response to receiving a transmission for a wireless transmit/receive unit (WTRU) in a downlink shared channel in a first transmission time interval (TTI), transmitting, by the WTRU, on a physical uplink channel in a second TTI to indicate an acknowledgement or a negative acknowledgement;
transmitting channel quality information periodically in TTIs, as periodic TTIs, on the physical uplink channel, wherein the channel quality information includes a delta channel quality information value;
wherein in response to the second TTI overlapping with one of the periodic TTIs, as an overlapping TTI, selectively including or dropping an indication of the channel quality information in the overlapping TTI on the physical uplink channel based on predefined rules established by a higher layer;
wherein in response to the second TTI not overlapping with one of the periodic TTIs of the channel quality information, transmitting, by the WTRU, an indication of the acknowledgement or negative acknowledgement and not the indication of the channel quality information; and
wherein the physical uplink channel is not a random access channel.

9. The method of claim 8 wherein the physical uplink channel is shared by a plurality of WTRUs.

10. The method of claim 8 further comprising transmitting in a TTI an indication of a request for uplink bandwidth on the physical uplink channel.

11. The method of claim 10 wherein in response to not sending an indication of an acknowledgement, a negative acknowledgement, channel quality information or the request for uplink bandwidth, not transmitting in a TTI by the WTRU on the physical uplink channel.

12. The method of claim 8 wherein transmissions on the physical uplink channel have a varying number of bits.

13. The method of claim 8 wherein transmissions on the physical uplink channel have a plurality of formats having a varying number of bits.

14. The method of claim 8 further comprising receiving by the WTRU physical channel resource parameters for physical uplink channel transmissions.

15. The WTRU of claim 1 wherein the channel quality information is transmitted based on predefined rules which are one of: (1) rules that are not associated with data transmission to the WTRU; or (2) rules associated with statistics of the data sent to the WTRU.

16. The WTRU of claim 15 wherein responsive to selection of one of the predefined rules, a format of the channel quality information transmitted or a characteristic of the channel quality information transmitted is adjusted.

17. The method of claim 8 further comprising selecting one of the predefined rules from the group consisting of: (1) rules that are not associated with data transmission to the WTRU; or (2) rules associated with statistics of the data sent to the WTRU.

18. The method of claim 8 wherein responsive to selection of one of the predefined rules, adjusting a format of the channel quality information transmitted or adjusting a characteristic of the channel quality information transmitted.

* * * * *